United States Patent
Mitchell et al.

(10) Patent No.: US 6,438,684 B1
(45) Date of Patent: *Aug. 20, 2002

(54) PUSH BUTTON SHUTDOWN AND RESET OF EMBEDDED SYSTEMS

(75) Inventors: Craig G. Mitchell, Mt. Prospect; Michael P. Dempsey, Chicago; Christian A. D'Souza, Mt. Prospect; Chandra S. Pandoy, Rolling Meadows; Scot W. Salzman, Buffalo Grove, all of IL (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,403

(22) Filed: Nov. 3, 1997

(51) Int. Cl.[7] .............................................. G06F 15/177
(52) U.S. Cl. .............................................. 713/1; 714/24
(58) Field of Search ................................. 395/575, 651, 395/750, 652; 370/116; 713/1, 100; 714/24, 25

(56) References Cited

U.S. PATENT DOCUMENTS

| | | |
|---|---|---|
| 4,385,384 A | 5/1983 | Rosbury et al. |
| 4,587,651 A | 5/1986 | Nelson et al. |
| 4,652,874 A | 3/1987 | Loyer |
| 4,751,510 A | 6/1988 | De Saint Michel et al. |
| 4,796,292 A | 1/1989 | Thomas |
| 4,797,878 A | 1/1989 | Armstrong |
| 4,879,716 A | 11/1989 | McNally et al. |
| 4,890,316 A | 12/1989 | Walsh et al. |
| 4,955,020 A | 9/1990 | Stone et al. |
| 4,991,169 A | 2/1991 | Davis |

(List continued on next page.)

FOREIGN PATENT DOCUMENTS

| | | | | |
|---|---|---|---|---|
| JP | 357111751 A | * | 7/1982 | ........... G06F/11/14 |
| JP | 403014014 A | * | 1/1991 | ............. G06F/1/24 |
| JP | 404128937 A | * | 4/1992 | ........... G06F/11/00 |
| JP | 404215155 A | * | 8/1992 | ........... G06F/12/16 |
| JP | 407013652 A | * | 1/1995 | ........... G06F/11/00 |

OTHER PUBLICATIONS

Microsoft Windows 95, 1995.
Microsoft Window NT, 1995.
M. Pecen, "A Bi–Directional Wire–Line to Local Area Network Interface Module: Summary of Functional Requirements and Fundamental Architecture" (Jan. 18,1994).
M. Pecen, et al., "A Bi–Directional Wire–Line to Local Area Network Interface and Method: Prototype Specifications" (Aug. 10, 1993).
D. Fink and D. Christianson, eds., "Electronics Engineers' Handbook", Ch. 22, pp. 22–45 to 22–53 (1989).

(List continued on next page.)

Primary Examiner—Thomas Lee
Assistant Examiner—Thuan Du
(74) Attorney, Agent, or Firm—McDonnell Boehnen Hullbert & Berghoff

(57) ABSTRACT

A system for shutting down and resetting an embedded system having a general purpose computing platform. A push button is provided for generating a push button reset signal to the shutdown and reset manager. The shutdown and reset manager receives the management reset signal and initiates a shutdown of the operating system. When the operating system has shutdown, the user presses the push button again. The second receipt of the push button reset signal initiates a hardware reset.

43 Claims, 5 Drawing Sheets

Microfiche Appendix Included
(1 Microfiche, 14 Pages)

U.S. PATENT DOCUMENTS

| | | |
|---|---|---|
| 5,025,500 A | 6/1991 | Phinney |
| 5,056,092 A * | 10/1991 | Bruner .................. 371/14 |
| 5,063,523 A | 11/1991 | Vrenjak |
| 5,119,403 A | 6/1992 | Krishnan |
| 5,148,435 A | 9/1992 | Ray, Jr. et al. |
| 5,151,896 A | 9/1992 | Bowman et al. |
| 5,157,658 A | 10/1992 | Arai et al. |
| 5,166,931 A | 11/1992 | Riddle |
| 5,184,348 A | 2/1993 | Abdelmouttalib et al. |
| 5,185,783 A | 2/1993 | Takahashi et al. |
| 5,187,735 A | 2/1993 | Garcia et al. |
| 5,199,071 A | 3/1993 | Abe et al. |
| 5,202,884 A | 4/1993 | Close et al. |
| 5,210,530 A | 5/1993 | Kammerer et al. |
| 5,220,560 A | 6/1993 | Ogasawara |
| 5,237,561 A | 8/1993 | Pyhälammi |
| 5,237,620 A | 8/1993 | Deaton et al. |
| 5,247,516 A | 9/1993 | Bernstein et al. |
| 5,255,309 A | 10/1993 | Katz |
| 5,259,023 A | 11/1993 | Katz |
| 5,303,266 A | 4/1994 | Budin et al. |
| 5,315,161 A * | 5/1994 | Robinson et al. .......... 307/66 |
| 5,315,647 A | 5/1994 | Araujo |
| 5,317,752 A * | 5/1994 | Jewett et al. ............ 395/750 |
| 5,361,259 A | 11/1994 | Hunt et al. |
| 5,374,952 A | 12/1994 | Flohr |
| 5,398,333 A * | 3/1995 | Schieve et al. .......... 395/575 |
| 5,402,474 A | 3/1995 | Miller et al. |
| 5,408,497 A * | 4/1995 | Baumann et al. ......... 370/116 |
| 5,410,754 A | 4/1995 | Klotzbach et al. |
| 5,416,776 A | 5/1995 | Panzarella et al. |
| 5,438,614 A * | 8/1995 | Rozman et al. .......... 379/93 |
| 5,528,595 A | 6/1996 | Walsh et al. |
| 5,548,763 A | 8/1996 | Combs et al. ............. 713/300 |
| 5,577,105 A | 11/1996 | Baum et al. |
| 5,687,371 A * | 11/1997 | Lee et al. ............... 395/651 |
| 5,696,979 A * | 12/1997 | Saitou .................... 395/750 |
| 5,768,496 A * | 6/1998 | Lidgett et al. ............ 714/25 |

OTHER PUBLICATIONS

C. Zewart, "Modern Handbook for the Communications Professional", pp. 15–41, 224–227 (1987).

J.A.C. Bingham, "The Theory and practice of Modem Design", pp. 37–55 (1988).

H.E.White, "A T1–Based DSP Modem for Interfacing Voice and Packet Networks", IEEE (1988).

P. Desmond, "Primary Access Adds PAD to network Access System", Network World, p. 17 (1991).

Advertisement for "Hot Swap Rack Systems Universal Input Power Factor Corrected or DC Inputs 24V and 48V" from Microsoft Internet Explorer, printed Sep. 9, 1997.

Advertisement for "Hot Swap 500 HP Series, Universal Input Power Factor Corrected or DC Inputs 24V and 48V" from Microsoft Internet Explorer, printed Sep. 9, 1997.

Advertisement for "Ezraid Pro, Faster Disk Transfer Simplified Data Management Real–Time Backups" from Microsoft Explorer, printed Sep. 9, 1997.

Advertisement for "Hot Swap" from Microsoft Internet Explorer, printed Sep. 9, 1997.

Advertisement for "Switching Power's Hot Swap Line Offers . . . " from Microsoft Internet Explorer, printed Sep. 9, 1997.

* cited by examiner

PUSH BUTTON SHUTDOWN AND RESET OF EMBEDDED SYSTEMS

MICROFICHE APPENDIX

This patent disclosure includes a microfiche appendix having one sheet of microfiche containing 14 frames. The microfiche appendix contains a computer program listing that is protected by copyright. The copyright owner has no objection to the facsimile reproduction of the patent disclosure as it appears in the Patent and Trademark Office patent files or records, but otherwise reserves all copyright rights whatsoever.

BACKGROUND OF THE INVENTION

A. Field of the Invention

This invention relates to the field of computer systems and more particularly to the shutdown and reset of embedded systems.

B. Description of Related Art and Advantages of the Invention

Embedded computer systems typically operate in real-time or multi-tasking environments for specific applications. Such systems typically include a processor, RAM, ROM and an interface to hardware devices required by the application. A disk drive is not normally needed because the processor in embedded systems does not normally perform general purpose file-based applications. When embedded systems are shutdown, the status of the machine may be saved by storing certain variables in non-volatile RAM, or the status may be gracefully set to a power down state from which the system may be gracefully powered-up.

Real-time or multi-tasking operating systems are available with the capability of performing in a general purpose computing environment. However, the startup, shutdown and reset of such systems is typically performed from a terminal through user action from a keyboard or a mouse. A shutdown or reset that resembles a power off condition, for example, from a reset switch, may not be performed in such general purpose environments without corrupting system files. The shutdown from a reset switch does not provide the operating system with the opportunity to perform disk synchronization or to close and save temporary files that may be open.

Embedded systems having a general purpose computing environment are finding increasing use and expanding features. For example, communications access devices are typically embedded systems. Whereas communication access devices have been designed to perform a limited role in terms of call processing and routing, with the ultimate destination for the calls being one or more host computers on the local area network, communications servers provide the network access functions of an integrated communications router in addition to a general purpose computing platform. The platform runs a commercially available stand alone or shareware operating system such as Windows® NT from Microsoft Corporation. The software that runs on the computing platform may perform, for example, network management, remote access, intranet web page, and other functions.

A communication access device with the integral general purpose computing platform, as described herein, provides a substantial advancement in the features and capabilities of a communication access device. For example, in an embodiment in which the communication access device is connected to the network, improved remote access service may be achieved since the general purpose computing platform can route certain calls to the LAN while terminating other calls, such as those calls that require access to information that is stored locally in the memory in the general purpose computing platform. Additionally, the general purpose computing platform may provide enhanced network management service efficiently controlling the flow of calls between the access device and the network. The general purpose computing platform may also provide protocol proxy service and authentication services.

Other embedded systems may find an increase in features and advantages when combined with a general purpose computing environment. For many such embedded systems however, the need to shutdown the system from the keyboard or mouse to avoid corrupting system files may be inconvenient. For example, an embedded system may have the keyboard and mouse separated from the hardware that carries out most of the embedded system and general purpose computing functions. It would be desirable if a shutdown and reset function were available without the need to use a keyboard or mouse.

The present invention includes a push button for resetting an embedded system without the need for a keyboard or mouse. The present invention also includes a system for initiating a shutdown and reset of the system in response to predetermined shutdown/reset conditions.

These and many other features and advantages of the invention will become more apparent from the following detailed description of preferred embodiments of the invention.

SUMMARY OF THE INVENTION

An embedded system having a general purpose computing environment uses a reset push button for shutting down the embedded system. An operating system is included for performing embedded system functions and general purpose computing functions. The reset push button generates a reset signal in response to a press of the reset push button by a user. A shutdown and reset manager senses the reset signal and initiates a shutdown of the operating system in response to the reset signal. The user presses the reset push button a second time to generate a second reset signal to reset the embedded system hardware and the shutdown and reset manager resets the hardware in response to the second reset signal.

In a further aspect of the present invention, a method is provided for shutting down an embedded system having a general purpose computing environment and an operating system. The method includes the step of generating a reset signal in response to a user press of the reset push button. The reset signal is received and the operating system is shutdown in response. The operating system shutdown includes the step of saving any open temporary files. Accordingly, in a preferred embodiment, the reset signal from the push button interrupts the operating system indicating a shutdown request. The user may wait for confirmation of a shutdown, or hit the reset push button again to cause the actual reset of the hardware.

DETAILED DESCRIPTION OF THE PREFERRED EMBODIMENT

Figure 1:
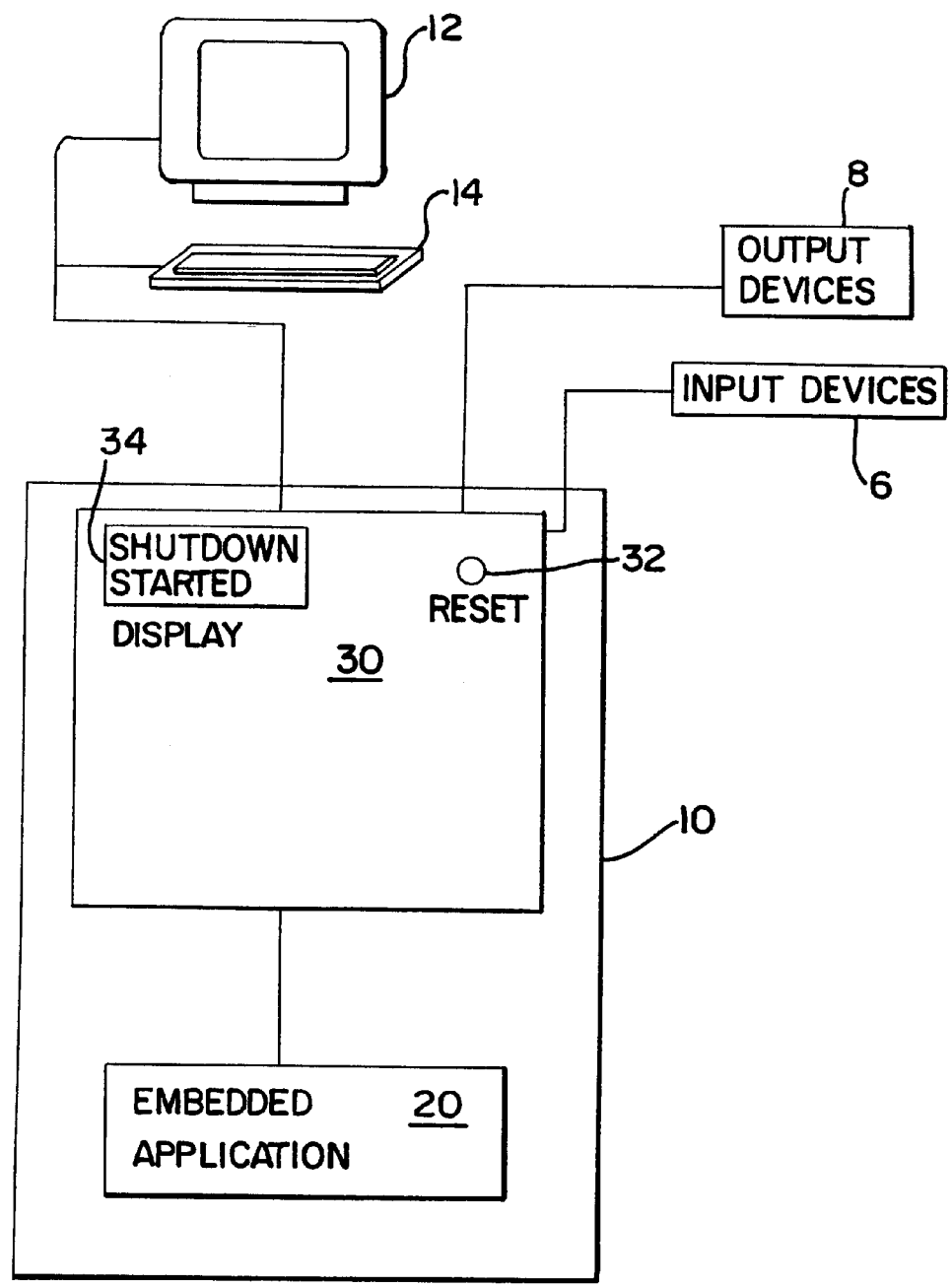
FIG. 1 is a block diagram of an embedded system in which the present invention finds particular use.

FIG. 1 is a block diagram of an embedded system 10 in which the present invention finds particular use. The embedded system 10 includes an embedded application 20 and a general purpose computing engine 30. The general purpose computing engine 30 includes a monitor 12 and a keyboard 14 to provide a user with an interface to general purpose applications. A plurality of output devices 8 and input devices 6 may be connected to the embedded system 10. The embedded system 10 also includes a reset button 32 and a status display 34.

The embedded application 20 includes the hardware and software components for performing real-time functions. The embedded application 20 in FIG. 1 may perform any set of real-time functions such as functions for controlling equipment in instrumentation, manufacturing and communications. The equipment is controlled by software components that function with one or more real-time operating systems. The embedded application may include circuitry that interfaces with general purpose computing engine 30. The circuitry may take the form of one or more modules having computing elements and software controlled by local real-time operating systems.

A real-time operating system, or an operating system with multi-tasking capabilities such as UNIX™-based operating system, Solaris 86™, Windows® NT™, Netware, etc., preferably runs in the general purpose computing engine 30 to provide the capability of performing functions that are part of the embedded application 20. The general purpose computing engine 30 also preferably includes general user applications that operate from a hard disk such as word processors, Internet browsers, spreadsheets, etc. One principal feature of the present invention is that the reset button 32 and a reset management system (described below with reference to FIGS. 3–6) in the general purpose computing engine 30 perform shutdown and reset operations that permit the operating system to shutdown in an orderly fashion. The orderly shutdown allows such operations as disk synchronization and the saving of temporary files and avoids the destructive shutdown previously associated with disk-based embedded systems.

Figure 2:
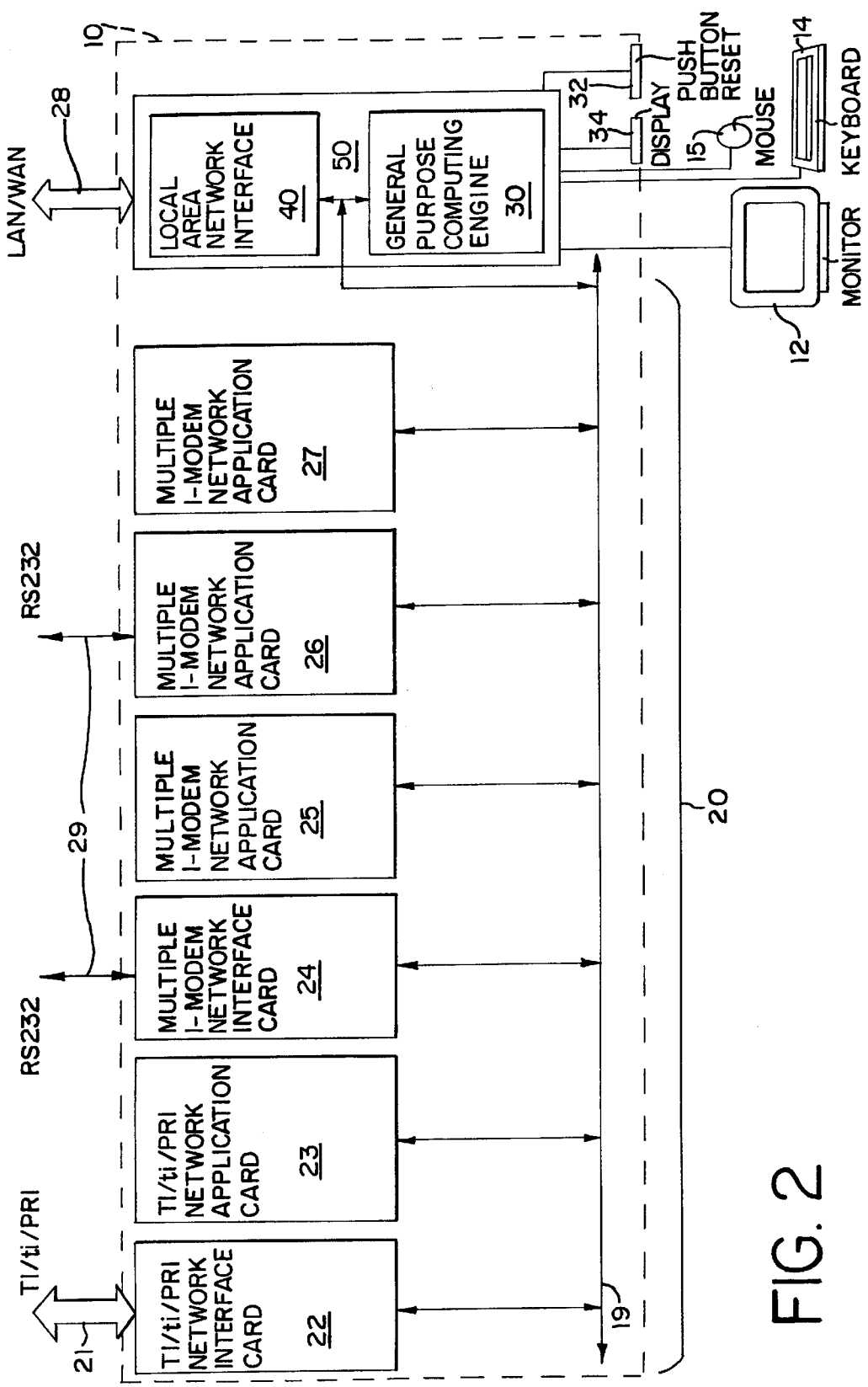
FIG. 2 is a block diagram of the system in FIG. 1 in which the embedded system is used as a communications system.

One example of the embedded system 10 of FIG. 1 is a product for providing network communications control. FIG. 2 is a block diagram of such a product, which is known commercially as the Total Control Network Enterprise Hub™, and is commercially available from 3COM Corp., 5400 Bayfront Plaza, Santa Clara, Calif., the assignee of the present invention. Persons of skill in the art are familiar with this product or with analogous products available from other telecommunications companies, such as Ascend Communications, Inc., Livingston, Communications, and Multitech.

The Total Control Network Enterprise Hub™ includes a plurality of cards in a communications chassis, one of the cards being a gateway card 50 which in a preferred embodiment is a product known as the EdgeServer™ card. The gateway card 50 in FIG. 2 includes the general purpose computing engine 30 and a local area network interface 40.

Other cards in the Total Control Network Enterprise Hub™ may include a T1/E1/PRI network interface card (NIC) 22, a T1/E1/PRI network application card (NAC) 23, one or more multiple modem network interface cards 24, 26 and one or more multiple modem network application cards 25, 27. The cards communicate with each other via a high speed internal chassis bus system 19. The T1/E1/PRI NIC 22 communicates externally via the T1/E1/PRI interface 21. The multiple modem NIC's 24, 26 communicate with attached computers over RS232 cables 29.

The chassis may optionally have a management card for managing the operation of the chassis. Such a management card may include the reset push button 32 and status display 34 as well as hardware and software components for managing the operation of the chassis. The management card may include hardware and software components that manage reset lines that are dedicated to individual cards.

The telephone line interface and application cards 22, 23 modem cards 24, 25, 26 27 and card 50 are described in great detail in terms of their component circuitry and operation in two issued United States patent, assigned to U.S. Robotics Access Corp., which are fully incorporated by reference herein: U.S. Pat. No. 5,577,105 of Baum et al., entitled "Telephone Call Switching and Routing Techniques for Data Communications," and U.S. Pat. No. 5,528,595 of Walsh et al., entitled "Modem Input/Output Signal Processing Techniques". The detailed structure of a preferred internal chassis bus 19 is described in U.S. Pat. No. 5,416,776 to Panzarella et al., entitled "Modem Backplane Techniques", also assigned to U.S. Robotics Access Corp., which is incorporated by reference herein. The management of a chassis by a management card is also described in detail in U.S. Pat. No. 5,436,614 to Panzarella et al., entitled "Modem Management Techniques," which is also assigned to U.S. Robotics Access Corp. and incorporated by reference herein.

Descriptions of examples of the EdgeServer Pro™ and of the Total Control Network Enterprise Hub™ may also be found in U.S. patent application Ser. No. 08/813,173 (titled "Communications Access Chassis with General Purpose Computing Platform" filed on Mar. 7, 1997) the contents of which are incorporated by reference herein. The cards that make up the chassis are also described in detail in the operators' manual that comes with the sale of the Total Control Network Enterprise Hub™, which is incorporated by reference herein.

Since the details of the telephone line interface and application cards 22, 23 modem cards 24, 25, 26, 27, internal chassis bus 19, computer network interface 40 of the gateway (or "EdgeServer Pro™") card 50 and the management cards (not shown) are already described elsewhere and persons skilled in the art already know how to build and design such circuits (or equivalent circuits), a detailed discussion of these components is not necessary. Additionally, the details as to the architecture or design of the embedded system are not particularly important. The particular arrangement of components on individual cards or the division of functionality (e.g., telephone interface, modem signal conversions, etc.) among individual cards is not important. The novelty of the present invention is believed to be in gracefully shutting down and resetting the embedded system. Thus, while the inventors'best mode known for practicing the invention will be set forth in the context of the particular system 10 of FIGS. 2–5, it will be appreciated that the inventors do not consider the invention limited to the particular system architecture or the particular embedded system application shown.

Figure 3:
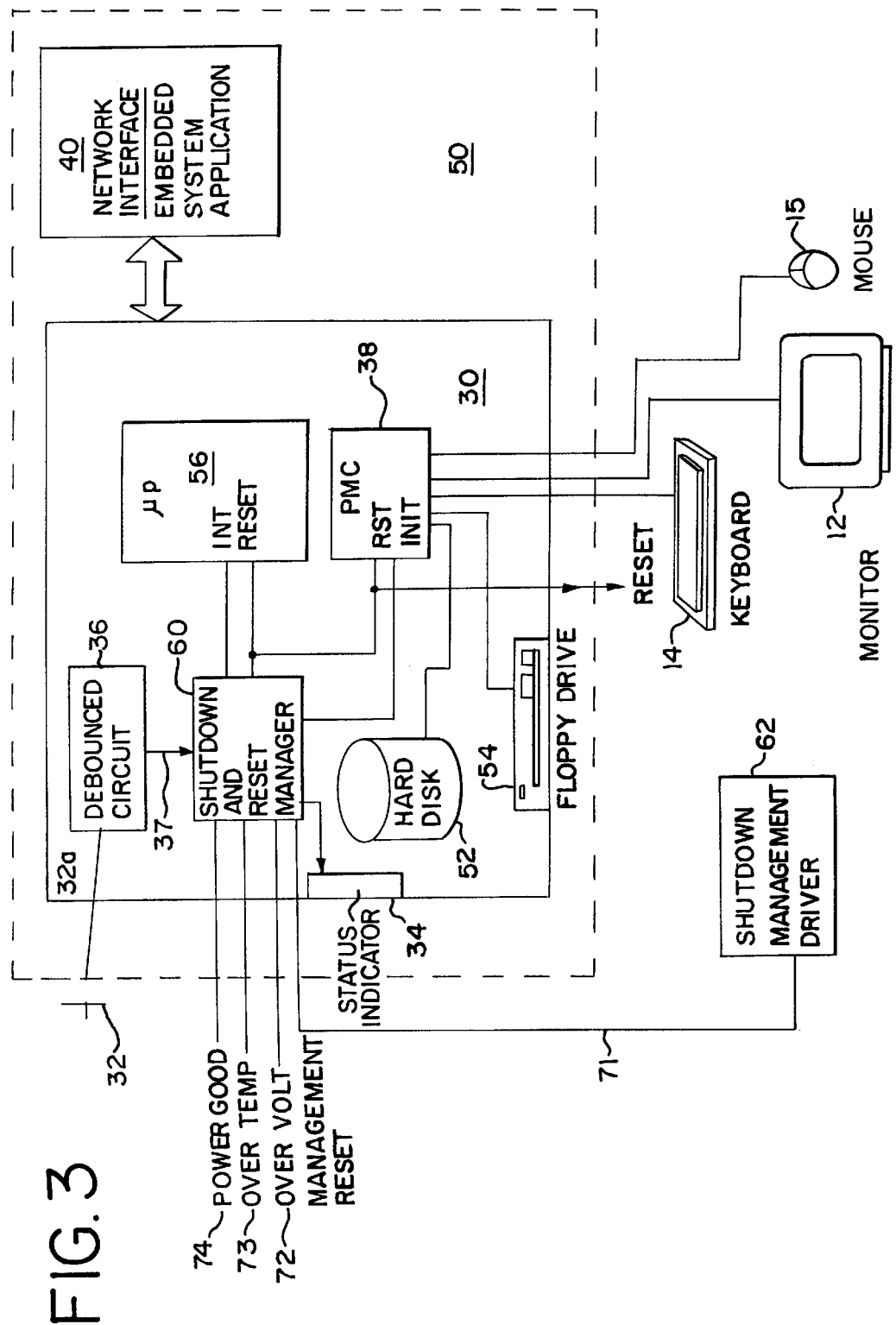
FIG. 3 a block diagram of the general purpose computer sub-system in the system of FIG. 2.

FIG. 3 is a block diagram of the gateway card 50 in the embedded system of FIG. 2. The gateway card 50 has incorporated thereon the hardware and software components comprising a general purpose computing platform. For example, the gateway card 50 includes a microprocessor 56. The gateway card 50 further includes a peripheral control interface and memory controller 1 5 having one or more user interface ports for receiving cables connected to user interface devices, such as the video monitor 12, the mouse 15, and the keyboard 14, enabling a user to interface with the general purpose computer in the system. The gateway card 50 further includes a hard disk memory 52 and a floppy disk drive 54 for storing and using commercially available software programs and databases and programs of interest to the remote users that may dial in to the system. The gateway card 50 may also include an external disk drive (not shown) enabling a user to download programs or data bases, or other information onto the hard disk, and a bus interface for connecting the general purpose computing platform to external memory storage devices on a bus such as a SCSI or SCSI-2 bus (not shown).

The gateway card 50 further includes the local area network interface 40 to an industry standard network used to connect remote computers to the system over the local area network 28 such as an Ethernet or Token Ring network. The network access and interface circuitry in the gateway card 50 performs certain protocol processing and placing the calls on a local or wide area network 28 that is connected to the system 10.

The gateway card 50 includes different ways to shutdown and reset the embedded system without causing file system corruption. The gateway card 50 includes a debounce circuit 36 and a shutdown and reset manager 60 for processing the shutdown and reset of the embedded system 10 without system corruption. The shutdown and reset of the embedded system 10 may be started when the user presses the reset button 32 or when a shutdown/reset condition is sensed. The reset button 32 is connected to the debounce circuit 36 which communicates a reset signal at 37 when the push button signal at 32a has reached a predetermined reset threshold level for a predetermined minimum threshold time. One preferred embodiment uses a MAX809 integrated circuit from MAXIM to implement the debounce circuit 36.

The reset signal at 37 feeds into the shutdown and reset manager 60. When the reset signal 37 is asserted, the shutdown and reset manager 60 generates an interrupt signal on the INT input of the microprocessor 56. During the interrupt service routine started by the interrupt signal, the shutdown of the operating system is initiated. The shutdown and reset manager 60 inhibits any further hardware reset until the operating system has completed the shutdown process. When the shutdown process has completed, the shutdown and reset manager 60 waits for a second push of the reset button 32. When the user pushes the reset button 32 a second time, the shutdown and reset manager 60 outputs a reset pulse to the microprocessor 56, the peripheral and memory controller (PMC) 38 and to any other hardware device that must be reset including hardware devices on other cards.

The embedded server may also be shutdown and reset at the gateway card 50 with user action using the keyboard and mouse to initiate shutdown at the operating system interface. An advantage of using the reset button 32 is that the keyboard and mouse may not be located where the chassis for the embedded system is located. If a user were to remove a card, or perform a maintenance function, the reset button 32 eliminates the need to locate the keyboard and mouse for entry of the shutdown command.

The shutdown and reset of the embedded system 10 may also be caused when a management reset line 71 is asserted. The management reset line is asserted by the shutdown management driver 62 which is a hardware or software component that controls a reset that permits a graceful shutdown of the operating system. Examples of functions that benefit from a graceful shutdown of the operating system include a system lockup, a watchdog timer timeout, or any system fault or other condition which may involve the shutdown of the system to permit user interaction.

Figure 4:
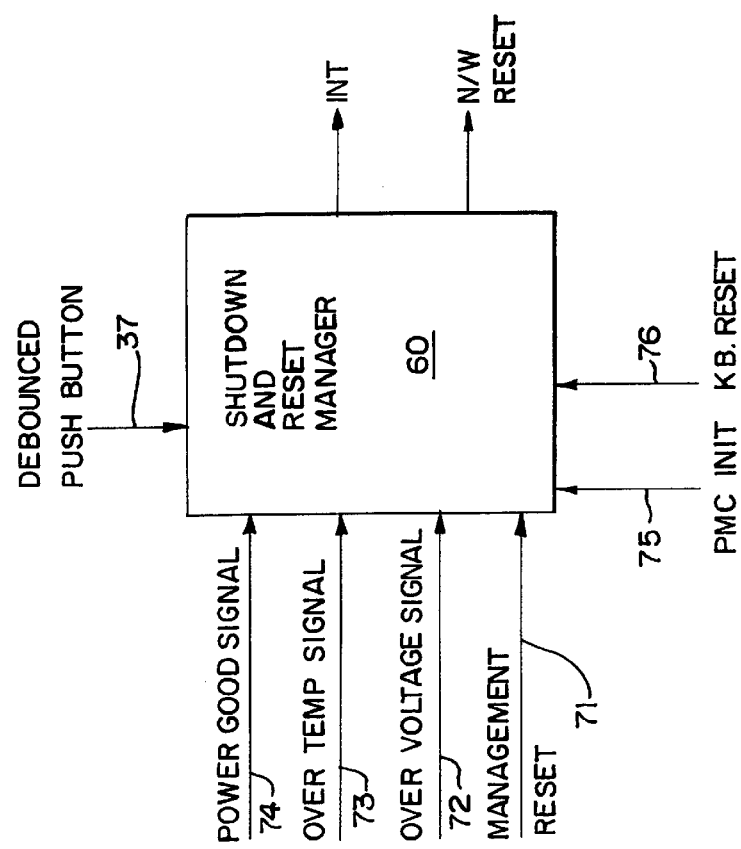
FIG. 4 is a block diagram of the shutdown and reset manager in FIG. 3.

The assertion of the management reset line is one of several shutdown/reset conditions in a preferred embodiment. The shutdown/reset conditions are conditions that require that the embedded system 10 be shutdown or reset. The block diagram of the shutdown and reset manager 60 in FIG. 4 shows inputs for signals that indicate representative examples of shutdown/reset conditions in a preferred embodiment. Examples of such conditions include a system lockup, a timeout of a watchdog timer, an over temperature condition, an over voltage condition or the loss of a POWER GOOD signal from one or more modules. The system lockup and watchdog timer timeout conditions may be indicated by the management reset signal.

The management reset 71, over temperature 73, over voltage 72 and loss of POWER GOOD signals 74, shown in FIG. 4, may be generated in different ways. For example, the signals may be generated by the shutdown management driver 62 (in FIG. 3). The shutdown management driver 62 may be located on the management card described above with reference to FIG. 2. The management card may include a watchdog timer or hardware and software components for monitoring temperature in the chassis, voltage at the power source or other signal and power signals at other cards. The management reset 71, over temperature 73, over voltage 72 and loss of POWER GOOD signals 74 may also be generated according to particular functions. For example, one example of an over temperature signal may be generated by a circuit that monitors a temperature sensor located near the processor. When the temperature sensor detects that the temperature of the processor 56 may have reached destructive levels, the circuit generates an over temperature signal shown in FIG. 4.

When a shutdown/reset condition is received by the shutdown and reset manager 60, the shutdown and reset manager 60 will either generate the interrupt signal at the INT input of the microprocessor 56 or generate the hardware reset, depending on the condition received. Any of the conditions may generate the interrupt; however, conditions such as the over temperature or over voltage conditions may generate the hardware reset to prevent destruction of components in the system.

The generation of the interrupt will cause the operating system to perform an orderly shutdown. The shutdown and reset manager 60 inhibits any hardware reset until the operating system has completed the shutdown. Once the shutdown of the operating system is complete, the hardware may be reset by either the pressing of the reset button 32 by the user or by the release and re-assertion of the management reset signal 71. The hardware reset using the reset button 32 may be used if the shutdown was caused by a fault condition such as the over temperature, over voltage or system lockup conditions. Once the system is shutdown, the user would perform any necessary maintenance and press the reset button when complete. The release and re-assertion of the management reset signal may be performed by the shutdown management driver 62 (in FIG. 3) according to hardware and software that may sense corrected conditions.

In a preferred embodiment, the shutdown and reset manager 60 is an ALTERA™ 7128 PLD, which is a programmable logic device that may be programmed to perform the functions of the shutdown and reset manager 60 as described above. For example, the PLD may be programmed to implement a state machine such as the one described below with reference to FIG. 6. The state machine in FIG. 6 may be implemented using the software in the Microfiche Appendix. The software has been written in VHDL, a hardware description language that is known to those of skill in the art. The reader is directed to the notice regarding copyright set forth above.

In alternative embodiments, the shutdown and reset manager 60 may be implemented using software that may be invoked using interrupts, polling or other suitable techniques.

Figure 5:
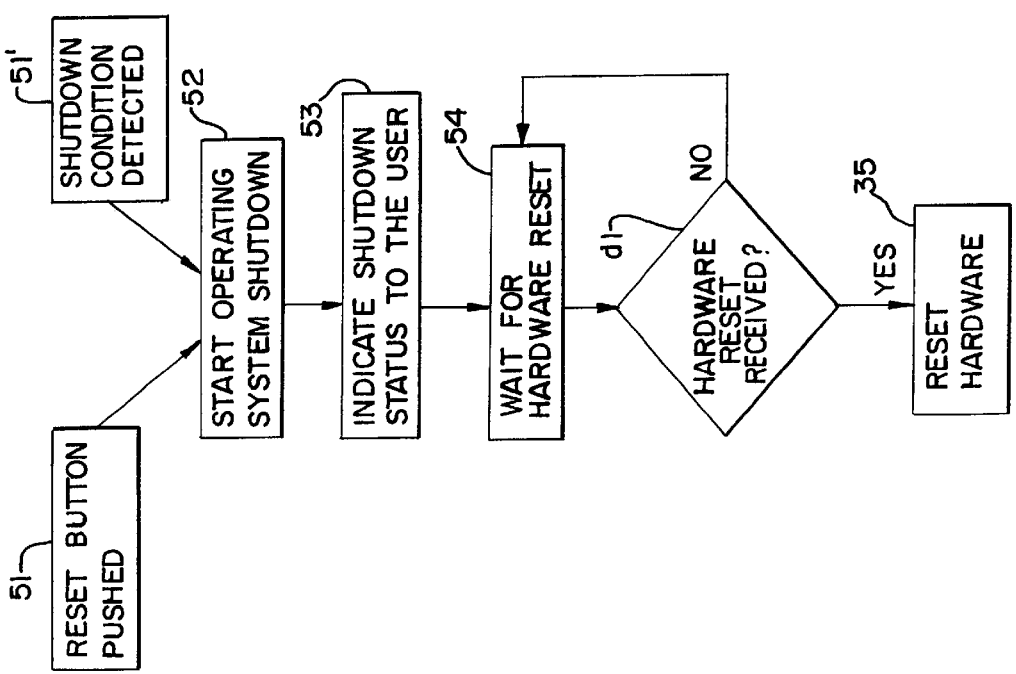
FIG. 5 is flowchart of a method of performing a shutdown and reset of an embedded system and FIG. 6 is a state diagram of the shutdown and reset manager of FIG. 5.

FIG. 5 is a flowchart of a method for shutting down and resetting the embedded system. One of ordinary skill in the art will appreciate that the flowchart in FIG. 5 may be carried out using a variety of different hardware and software configurations. One such configuration includes the shutdown and reset manager described above with reference to FIGS. 3 and 4.

The method begins at step s1 or s1' in FIG. 5 with a shutdown and reset action. At step s1, the shutdown and reset action is the press of the reset button 32 by the user. The occurrence of either step s1 or s1' will cause the operating system to begin to shutdown as shown at step s2. The shutdown of the operating system includes a disk synchronization process in which any open temporary files may be saved and the status of the system stored for use when the system is re-started. The initiation of the shutdown of the system may be indicated on the status display 34 as shown at step s3.

Once the operating system has completed the shutdown operation, the shutdown and reset manager waits for a hardware reset signal at decision block d1. The shutdown management driver may receive the hardware reset signal as a second push of the reset button 32 (in FIG. 1), or by a trigger through the reset line. When the hardware reset signal is received, the shutdown and reset manager performs all hardware reset functions.

Figure 6:
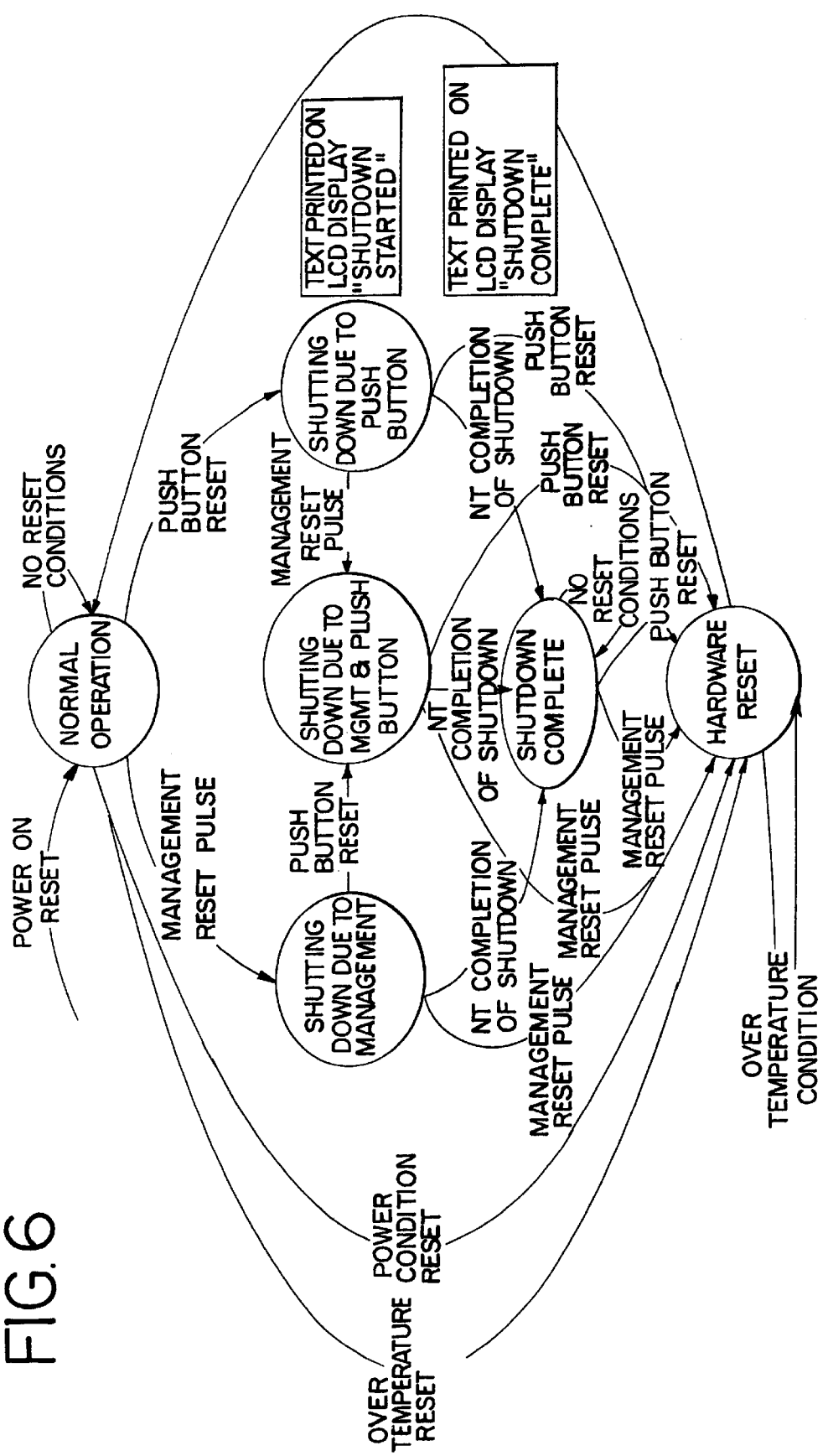

The state machine in FIG. 6 illustrates one embodiment of the flowchart in FIG. 5. Step s1 is represented in the state machine of FIG. 6 by the transition from 'NORMAL OPERATION' to 'SHUTTING DOWN DUE TO PUSH BUTTON.'

At step s1', the shutdown and reset action is triggered upon sensing the occurrence of a shutdown condition. Step s1 is represented in the state machine of FIG. 6 by the transition from 'NORMAL OPERATION' to 'SHUTTING DOWN DUE TO MANAGEMENT.'

According to the state machine in FIG. 6, the shutdown condition that causes this transition is the shutdown condition received from the shutdown management driver 62 (in FIG. 3). The over temperature and power condition signals cause a transition to the 'HARDWARE RESET' state. If the shutdown condition from the shutdown management driver 62 is received while in the 'SHUTTING DOWN DUE TO PUSH BUTTON' state, or if the push button reset is received while in the 'SHUTTING DOWN DUE TO MANAGEMENT' state, the 'SHUTTING DOWN DUE TO MGMT & PUSH BUTTON' state is entered. During the 'SHUTTING DOWN DUE TO MANAGEMENT', 'SHUTTING DOWN DUE TO PUSH BUTTON' and 'SHUTTING DOWN DUE TO MGMT & PUSH BUTTON' states, the operating system (in FIG. 6, WINDOWS NT™ is assumed) performs its shutdown.

When the operating system has completed its shutdown, the 'SHUTDOWN COMPLETE' state is entered. If the push button reset is pressed, or if the management reset is generated before the operating system has completed its shutdown, then the 'HARDWARE RESET' state is entered. Ordinarily, the user waits for the 'SHUTDOWN COMPLETE' state to press the reset push button. When the push button reset is pressed, or when the management reset is received while in the 'SHUTDOWN COMPLETE' state, the 'HARDWARE RESET' state is entered.

While the invention has been described in conjunction with presently preferred embodiments of the invention, persons of skill in the art will appreciate that variations may be made without departure from the scope and spirit of the invention. For example, variations may be made, or exist in the types of conditions that may be monitored for shutdown/reset, the manner of implementing the shutdown and reset manager, the manner of implementing the shutdown management driver, and the type of embedded system application used. This true scope and spirit is defined by the appended claims, interpreted in light of the foregoing.

What is claimed is:

1. A system for shutting down an embedded system having a general purpose computing environment comprising:

an operating system operable to provide resources for embedded applications and general purpose computing, to control access to a disk-storage system and to manage a plurality of temporary files stored in the disk-storage system;

a chassis having a plurality of cards therein, the plurality of cards operable by the operating system, at least one of the plurality of cards being a management card for managing the operation of the chassis, the management card comprising a reset push button for generating a reset signal when a user presses the reset push button: and a shutdown and reset manager for sensing said reset signal, said shutdown and reset manager being operable to initiate an orderly shutdown of the operating system in response to said reset signal by saving the temporary files and synchronizing the disk-storage system.

2. The system of claim 1 wherein said shutdown and reset manager generates a hardware reset in response to a second generation of the reset signal when the user presses the reset push button a second time.

3. The system of claim 1 further comprising:

a display device for displaying a shutdown status message.

4. The system of claim 1 wherein:

the chassis is operatively corrected to a keyboard;

the chassis is located separate from the keyboard, and the push button is mounted on the chassis, thereby enabling the user to orderly shutdown the embedded system by pushing the push button on the chassis.

5. A method for shutting down an embedded system having a general purpose operating environment and an operating system, the embedded system including a chassis having a plurality of cards therein, the plurality of cards operable by the operating system, at least one of the plurality of cards being a management card for managing the operation of the chassis, the management card comprising a reset push button for generating a reset signal when a user presses the reset push button, the method comprising the steps of generating a reset signal in response to a user press of the reset push button;

receiving the reset signal; and orderly shutting down the operating system in response to the reset signal by saving any open temporary files.

6. The method of claim 5 Further comprising the steps of:

generating a second reset signal when the user presses the reset push button a second time; and resetting the embedded system in response to the second reset signal.

7. A system for shutting down an embedded system having a general purpose computing environment comprising:

an operating system operable to provide resources for embedded applications and general purpose computing, to control access to a disk-storage system and to manage a plurality of temporary files stored in the disk-storage system;

a chassis having a plurality of cards therein, the plurality of cans operable by the operating system, at least one of the plurality of cards being a management card for managing the operation of the chassis, the management card comprising a reset push button for generating a reset signal when a user presses the reset push button; and a shutdown and reset manager for sensing said reset signal, said shutdown and reset manager initiating an orderly shutdown of the operating system when the user presses the reset push button a first time by saving the temporary files and synchronizing the disk-storage system, and generating a hardware reset when the user presses the reset push button a second time.

8. The system of claim 7 further comprising a display device for displaying a shutdown status message.

9. An improvement to a network access server for providing network communications control, the network access server comprising at least one telephone line interface connected to a computer network interface by a high-speed bus, and an operating system operable to provide resources for embedded applications and general purpose computing, and to control access to a disk-storage system and to manage a plurality of temporary files stored in the disk-storage system, the improvement comprising:

a chassis having a plurality of cards therein, the plurality of cards operable by the operating system, at least one of the plurality of cards being a management card for managing the operation of the chassis, the management card comprising a reset push button for generating a reset signal when a user presses the reset push button; and a shutdown and reset manager for sensing said reset signal, said shutdown and reset manager initiating an orderly shutdown of the operating system in response to said reset signal by saving the temporary files and synchronizing the disk-storage system.

10. The improvement of claim 9 wherein the shutdown and reset manager generates a hardware reset when the user presses the reset push button a second time.

11. The improvement of claim 9 further comprising a display device for displaying a shutdown status message.

12. The improvement of claim 9 further comprising: a telephone line interface card; and a gateway card for providing computer network access.

13. The improvement of claim 12 wherein: the management card includes a display device for displaying a shutdown message.

14. The improvement of claim 9 wherein the operating system is the WINDOWS operating system from Microsoft.

15. A system for shutting down a computing system comprising:

a general purpose computing platform comprising a processor and a storage system, the general purpose computing platform being operable to execute a plurality of general purpose applications stored in tho storage system, said general purpose applications being operable to provide a user with computing functions during execution, the general purpose computing platform being connected to at least one embedded application operable to perform real-time functions using at least one real-time operating system;

an operating system to execute in the general purpose computing platform the operating system operable to provide computing resources to the general-purpose applications, the storage system being operable to store at least one temporary data file associated with the at least one embedded application and to close the at least one temporary data file during an orderly shutdown of the operating system;

a chassis having a plurality of cards therein. the plurality of cards operable by the operating system, at least one of the plurality of cards being a management card for managing the operation or the chassis, the management card comprising a reset push button for generating a reset signal when a user presses the reset push button; and a shutdown and reset manager for sensing said reset signal, said shutdown and reset manager being operable to initiate the orderly shutdown of the operating system in response to the reset signal and to complete the orderly shutdown when the storage system has closed the at least one temporary data file.

16. The system of claim 15 wherein said shutdown and reset manager generates a hardware reset in response to a second generation of the reset signal when the user presses the reset push button a second time, said hardware reset being operable to re-initialize the computing system.

17. The system of claim 15 further comprising:

a display device for displaying a shutdown status message.

18. The system of claim 15 wherein the (computing system comprises an) at least one embedded application (that) uses the storage system for memory resources, the embedded application being operable to shutdown when the shutdown and reset manager completes the orderly shutdown.

19. The system of claim 18 wherein the embedded application is stored in memory on a card connected to a bus system on the computing system, the card comprising an embedded processor for performing the embedded application.

20. The system of claim 19 wherein the card comprising the embedded application further includes the reset button.

21. The system of claim 20 wherein the card is mounted in the chassis and is located remote from the processing unit of the computing system.

22. A method for shutting down a computing system having an operating system, a connection to at least one embedded application, a storage system, and a chassis having a plurality of cards therein, the plurality of cards operable by the operating system, at least one of the plurality of cards being a management card for managing the operation of the chassis, the management card comprising a reset push button for generating a reset signal when a user presses the reset push button, the method comprising the steps or:
generating a reset signal in response to a user press of the reset push button;

receiving the reset signal;

initiating an orderly shutdown of the operating system in response to the reset signal by a method comprising the step of saving at least one open temporary file associated with the at least one embedded application; and completing the shutdown of the operating system after the at least one open temporary file has been saved.

23. The method of claim 22 further comprising the steps of:

generating a second reset signal when the user presses the reset push button a second time;

waiting for the completing of the shutdown of the operating system; and re-initializing the computing system in response to the second reset signal.

24. A system for shutting down a computing system comprising:

a general purpose computing platform comprising a processor and a storage system, the general purpose computing platform being operable to execute a plurality of general purpose applications stored in the storage system, said general purpose applications being operable to provide a user with computing functions during execution;

an operating system executing in the general purpose computing platform, the operating system operable to provide computing resources to the general-purpose applications, the storage system being operable to store a plurality of temporary data files and to close the temporary data files during an orderly shutdown of the operating system;

the general purpose computing platform being connected to a chassis comprising at least one embedded application card, the chassis being physically located in a remote location relative to the general purpose computing platform;

a reset button for generating a reset signal when a user presses the reset push button, the reset button being mounted in the at least one embedded application card; and a shutdown and reset manager for sensing said reset signal, said shutdown and reset manager being operable to initiate the orderly shutdown of the operating system in response to the reset signal, to complete the orderly shutdown when the storage system has saved and closed the temporary data files and to generate a hardware reset when the user presses the reset push button a second time.

25. The system of claim 24 further comprising a display device for displaying a shutdown status message.

26. An improvement to a network access server for providing network communications control, the network access server comprising at least one telephone line interface connected to a computer network interface by a high-speed bus, an operating system operable to provide resources for embedded applications and general purpose computing, and a reset push button for generating a reset signal when a user presses the reset push button, the improvement comprising:

a shutdown and reset manager for sensing said reset signal, said shutdown and reset manager being operable to initiate the orderly shutdown of the operating system in response to the reset signal and to complete the orderly shutdown when the storage system has closed the temporary data files, a chassis having a plurality of cards therein, at least one of said cards being a telephone line interface card, at least one of said cards being a gateway card for providing computer network access; and a management card mounted in the chassis for managing the operation of the chassis, the management card comprising the reset push button.

27. The improvement of claim 26 wherein the shutdown and reset manager generates a hardware reset when the user presses the reset push button a second time.

28. The improvement of claim 26 further comprising a display device for displaying a shutdown status message.

29. The improvement of claim 26 wherein:

the management card includes a display device for displaying a shutdown message.

30. The improvement of claim 28 wherein the operating system is the WINDOWS operating system from Microsoft.

31. A system for shutting down an embedded system having a general purpose computing environment comprising:

a chassis having a plurality of cards therein, at least one of the plurality of cards being a telephone line interface card and at least one of the plurality of cards being a gateway card for providing computer network access;

a management card mounted in the chassis for managing operation of the chassis, the management card comprising a reset push button for generating a reset signal when a user presses the reset push button;

an operating system coupled to the chassis operable to provide resources for embedded applications and general purpose computing, to control access to a disk-storage system and to manage a plurality of temporary files stored in the disk-storage system, wherein at least one of the embedded applications controls operation of the plurality of cards; and a shutdown and reset manager for sensing the reset signal, the shutdown and reset manager being operable to initiate an orderly shutdown of the operating system in response to the reset signal by saving the temporary files and synchronizing the disk-storage system, wherein the orderly shutdown of the operating system initiates an orderly shutdown of the embedded applications, thereby releasing control of the plurality of cards.

32. The system of claim 31 wherein:

the operating system is connected to a keyboard;

the chassis is located separate from the keyboard: and the reset push button is located within the chassis thereby enabling the user to orderly shutdown the operating system by pushing the reset push button on the chassis.

33. The system of claim 31 wherein the shutdown and reset manager is a programmable logic device programmed to implement a state machine.

34. The system of claim 1 wherein the shutdown and reset manager initiates a reset of the operating system and the plurality of cards in response a user press of the reset push button a second time.

35. A system for shutting down a computing system comprising, a general purpose computing platform comprising a processor and it storage system, the general purpose computing platform being operable to execute a plurality of general purpose applications stored in the storage system, the general purpose applications being operable to provide a user with computing functions during execution;

the general purpose computing platform being connected to at least one embedded application operable to perform real-time functions using at least one real-time operating system, the at least one embedded application using the storage system for memory resources, an operating system to execute in the general purpose computing platform, the operating system operable to provide computing resources to the general-purpose applications, the storage system being operable to store at least one temporary data file associated with the at least one embedded application and to close the at least one temporary data file during an orderly shutdown of the operating system;

a chassis having a plurality of cards therein, the plurality of cards operable by the operating system, at least one of the plurality of cards being a management card for managing the operation of the chassis, the management card comprising a reset push button for generating a reset signal when a user presses the reset push button; and a shutdown and reset manager for sensing the reset signal, the shutdown and reset manager being operable to initiate the orderly shutdown of the operating system in response to the reset signal and to complete the orderly shutdown when the storage system has closed the at least one temporary data file. the embedded application being operable to shutdown when the shutdown and reset manager completes the orderly shutdown.

36. The system of claim 35 wherein the shutdown and reset manager initiates z reset of the operating system in response a user press of the reset push button a second time.

37. A system for shutting down a computing system comprising:

a general purpose computing platform comprising a processor and a storage system, he general purpose computing platform being operable to execute a plurality of general purpose applications stored in the storage system said general purpose applications being operable to provide a user with computing functions during execution;

a chassis having a plurality of cards therein, the chassis connected to a bus system on the computing system, at least one of the cards being a management card for managing operation of the His, the management cud including at cast one embedded application operable to perform real-time functions using at least one real-time operating system and an embedded processor for performing the embedded application, the at least one embedded application using the storage system for memory resources;

the management card including the at least one embedded application includes t reset push button for generating a reset signal when the user presses the reset push button;

the general purpose computing platform being connected to the at least one embedded application;

an operating system to execute in the general purpose computing platform, the operating system operable to provide computing resources to the general-purpose applications, the storage system being operable to store at least one temporary data file associated with the at least one embedded application and to close the at least one temporary data file during an orderly shutdown of the operating system; and a shutdown and reset manager for sensing the reset signal, the shutdown and reset manager being operable to initiate the orderly shutdown of the operating system in response to the reset signal and to complete the orderly shutdown when the storage system has closed the at least one temporary data file, the at least one embedded application being operable to shutdown when the shutdown and reset manager completes the orderly shutdown.

38. The system of claim 37 wherein the shutdown and reset manager initiates a reset of the operating system And the at least one embedded application in response a user press of the reset push button a second time.

39. A method for shutting down an embedded system having a general purpose operating environment and an operating system, the embedded system including a chassis having a plurality of cards therein, at least one of the cards being a telephone line interface card, at least One of the cards being a gateway card for providing computer network access and at least one of the cards being a management card for managing operation of the chassis, the management curd comprising a reset push button, the method comprising the steps of.:

generating a reset signal in response to a user press of the reset push button;

receiving the reset signal; and orderly shutting down the operating system in response to the reset signal by saving any open temporary files, wherein the orderly shutdown of the operating system initiates an orderly shutdown of the embedded system, thereby shutting down the plurality of cards.

40. The method of claim 39 wherein:

the operating system is connected to a keyboard;

the chassis is located separate from the keyboard; and the rest push button is located within the chassis thereby enabling the user to orderly shutdown the operating system by pushing the reset push button on the chassis.

41. The method of claim 39 further comprising generating a second reset signal in response to a user press of the reset push button a second time and resetting the operating system in response to receiving the second reset signal.

42. An improvement to a network access server for providing network communications control, the network access server comprising at least one telephone line interface connected to a computer network interface by a high-speed bus, an operating system operable to provide resources for embedded applications and general purpose computing, to control access to a disk-storage system and to manage a plurality of temporary files stored in the disk-storage system, the improvement comprising:

a chassis having a plurality of cards therein, the plurality of cards operable by the operating system, at least one of the plurality of cards being a telephone line interface card, at least one of the plurality of cards being a gateway card for providing computer network access and at least one of the plurality of cards being a management card for managing the operation of the chassis, the management card comprising a reset push button for generating a reset signal when a user presses the reset push button; and a shutdown and reset manager for sensing the reset signal, the shutdown and reset manager initiating an orderly shutdown of the operating system in response to the reset signal, thereby initiating an orderly shut down of the plurality of cards, wherein the orderly shutdown of the operating system includes saving the temporary files and synchronizing the disk-storage system.

43. The improvement of claim 42 wherein the shutdown and reset manager initiates a reset of the operating system and the plurality of cards in response a user press of the reset push button a second time.

* * * * *